United States Patent [19]
Arikawa

[11] Patent Number: 5,141,296
[45] Date of Patent: Aug. 25, 1992

[54] FLUID PRESSURE BRAKE CONTROL APPARATUS FOR VEHICLE

[75] Inventor: Tetsuro Arikawa, Yokohama, Japan
[73] Assignee: Nippon A B S, Ltd., Tokyo, Japan
[21] Appl. No.: 561,900
[22] Filed: Aug. 2, 1990

[30] Foreign Application Priority Data
Aug. 3, 1989 [JP] Japan ................. 1-201815

[51] Int. Cl.⁵ ............................................. B60T 8/00
[52] U.S. Cl. ............................ 303/113 TR; 303/116 R
[58] Field of Search ............... 303/113, 116, 110, 199, 303/114, 93, 113 TR, 116 R, 116 SP, 119 R, 113 R

[56] References Cited

U.S. PATENT DOCUMENTS

| | | | |
|---|---|---|---|
| 3,866,983 | 2/1975 | Kondo | 303/21 |
| 4,509,802 | 4/1985 | Solleder et al. | 303/110 |
| 4,585,281 | 4/1986 | Schnurer | 303/116 |
| 4,627,671 | 12/1986 | Matsui et al. | 303/116 |
| 4,726,630 | 2/1988 | Krohn et al. | 303/119 |
| 4,818,039 | 4/1989 | Bertling et al. | 303/113 |
| 4,861,418 | 8/1989 | Burckhardt et al. | 303/116 |
| 5,015,043 | 5/1991 | Resch | 303/119 |

FOREIGN PATENT DOCUMENTS
0077350  3/1990  Japan ..................... 303/116

*Primary Examiner*—Matthew C. Graham
*Attorney, Agent, or Firm*—Carothers and Carothers

[57] ABSTRACT

A fluid pressure brake control apparatus for controlling braking-slip and driving-slip of wheels includes fluid pressure control valves, a fluid pressure pump and a valve apparatus arranged between the fluid pressure control valves and the master cylinder, and between the fluid pressure control valves and a fluid pressure source. In a first condition the fluid pressure valving is connected with the master cylinder while being cut off from the fluid pressure source. In a second condition the fluid pressure control valving is connected with the fluid pressure source while being cut off from the master cylinder. In a third condition the fluid pressure control valving is cut off from both the master cylinder and the fluid pressure source. The apparatus assumes the second condition during driving-slip control and supplies to the fluid pressure source the pressurized brake fluid discharged from the fluid pressure pump.

16 Claims, 2 Drawing Sheets

FIG. 2 (II)

FIG. 2 (III)

FLUID PRESSURE BRAKE CONTROL APPARATUS FOR VEHICLE

BACKGROUND OF THE INVENTION

1. Field of the Invention

This invention relates to a fluid pressure brake control apparatus for a vehicle which is operable to control the braking slip and the driving slip of the wheels.

2. Description of the Prior Art

For example, the Japanese Patent Official Gazzette No. 94861/1985 discloses the following fluid pressure brake control apparatus: An electro-magnetic three-port three-position change-over valve as a fluid pressure control valve is arranged between a master cylinder and a wheel cylinder. Further, an electro-magnetic three-port two-position change-over valve as a valve apparatus is arranged between the above electro-magnetic three-port three-position change-over valve and the master cylinder, and it is changed over to the position in which the master cylinder side and the wheel cylinder side are cut off from each other, and the wheel cylinder side is made to communicate with a fluid pressure source or a pressure supply source, in the driving-slip control operation.

However, when the above electro-magnetic three-port two-position change-over valve is changed over, the fluid pressure source or pressure supply source is made instantaneously to communicate with the master cylinder. There is the possibility that the high pressure fluid from the fluid pressure source is applied to the piston seal portion in the master cylinder and the latter is damaged.

The Japanese Patent Official Gazzette No. 102367/1986 discloses the following fluid pressure brake control apparatus:

A fluid pressure control valve is arranged between a master cylinder and a wheel cylinder, and it is connected through a valve apparatus to a fluid pressure supply source consisting of a fluid pressure pump and a hydraulic accumulator.

In the driving-slip control operation, the wheel cylinder side and the master cylinder side are cut off from each other by action of the fluid pressure control valve, and the side of the fluid pressure supply source is made to communicate with the wheel cylinder side by action of the valve apparatus.

In the braking slip (anti-skid) control operation, the valve apparatus is changed over to the other position in which the side of the hydraulic accumulator and the side of the fluid pressure control valve are cut off from each other and an open hydraulic reservoir is made to communicate with the fluid pressure control valve. In this apparatus, the fluid pressure control valve consists of two cut-off valve members. The brake pressure is increased, decreased and maintained at constant by actions of the two cut-off valve members. Since the hydraulic reservoir is open to the atmosphere and so the brake conduit forms the open loop, the pressurized brake fluid must be supplied into wheel cylinder from the master cylinder, when the brake fluid pressure should be again increased after the end of the decrease control of the brake fluid pressure. In that case, the forward movement length of the piston in the master cylinder becomes very large, and under certain circumstances, it reaches the full stroke at which the brake pressure cannot be increased more.

SUMMARY OF THE INVENTION

Accordingly, it is an object of this invention to provide a fluid pressure brake control apparatus in which the forward movement length of the piston in the master cylinder can be prevented from becoming very large, in the braking-slip control operation.

Another object of this invention is to provide a fluid pressure brake control apparatus in which the communication between the pressure source side and the master cylinder side can be securely avoided on the start of the driving-slip control operation and on the end of the driving-slip control operation.

In accordance with an aspect of this invention, there is provided a pressure brake control apparatus for a vehicle, controlling braking-slip and driving-slip of wheels, and comprising:

(A) fluid pressure control valve means arranged between a fluid pressure source for driving-slip control and a master cylinder, and wheel brake apparatus, for controlling brake fluid pressure of said wheel brake apparatus;

(B) a valve apparatus arranged between said fluid pressure control valve means and the master cylinder, and between said fluid pressure control valve means and the fluid pressure source, the valve apparatus taking a first condition in which the side of said fluid pressure control valve means is made to communicate with the side of the master cylinder, while the side of said fluid pressure control valve means is cut off from the side of the fluid pressure source, a second condition in which the side of the fluid pressure control valve means is made to communicate with the side of the fluid pressure source, while the side of the fluid pressure control valve means is cut off from the side of the master cylinder and a third condition in which the side of the fluid pressure control valve means is cut off from the side of the master cylinder, and the side of said fluid pressure control valve means is cut off from the side of the fluid pressure source;

(C) fluid pressure pump means which pressurizes brake fluid discharged through the fluid pressure control valve means from the wheel brake apparatus, when the brake pressure is lowered with control of the fluid pressure control valve means and is able to supply the pressurized brake fluid into a conduit connecting the valve apparatus with the fluid pressure control valve means; and (D) the valve apparatus taking the second condition during the driving-slip control and being able to supply to the fluid pressure source the pressurized brake fluid discharged from the fluid pressure pump means.

The foregoing and other objects, features, and advantages of the present invention will be more readily understood upon consideration of the following detailed description of the preferred embodiments of the invention, taken in conjuction with the accompanying drawings.

DESCRIPTION OF THE PREFERRED EMBODIMENTS

Next, a fluid pressure brake control apparatus for a vehicle, according to an embodiment of this invention, will be described with reference to the drawings.

Figure 1:
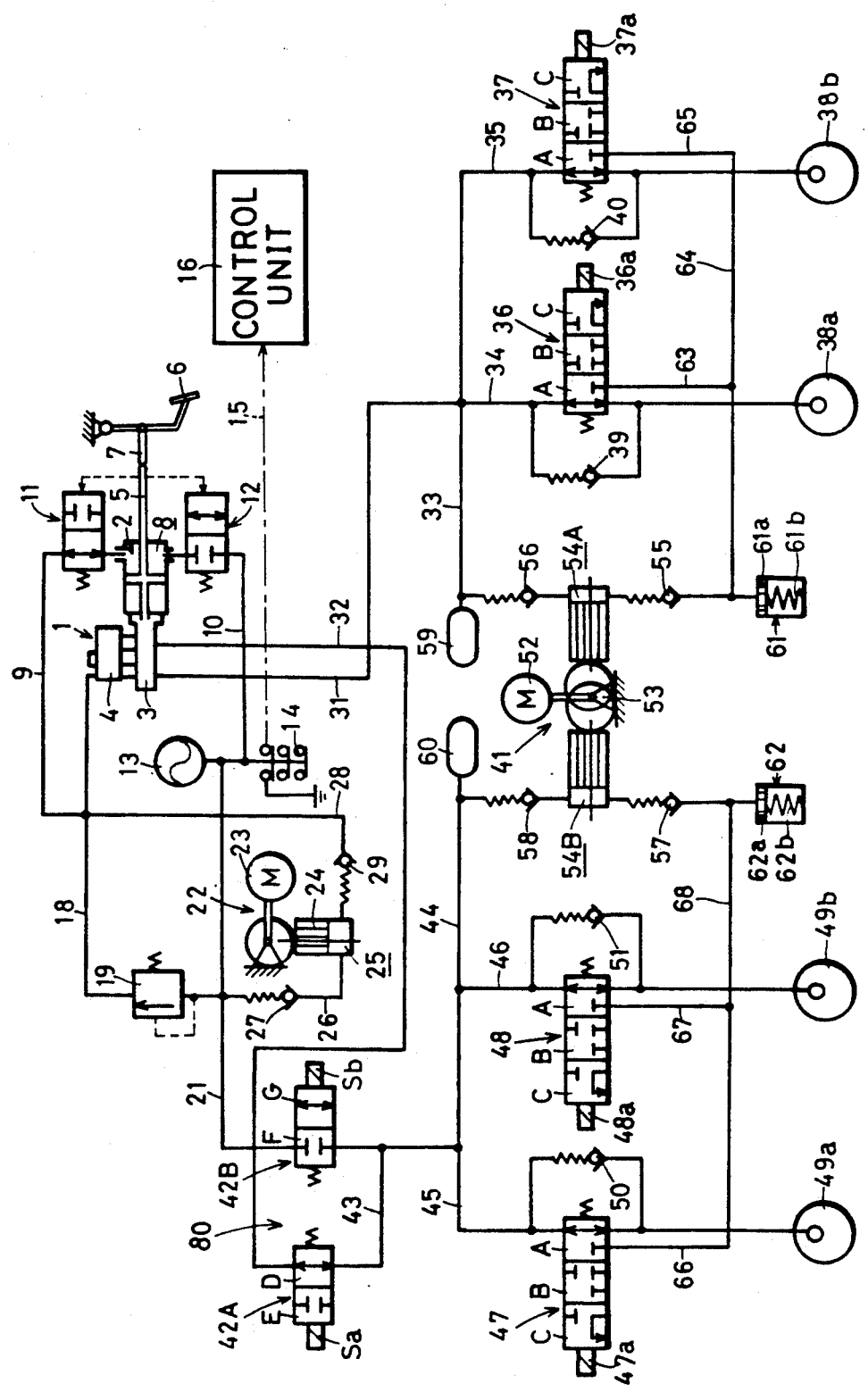
FIG. 1 is a conduit diagram of a fluid pressure brake control apparatus for vehicle according to an embodiment of this invention.

In FIG. 1, a tandem master cylinder with booster 1 consists of a booster part 2, a master cylinder part 3 combined with the output side of the booster part 2, and a hydraulic fluid reservoir 4 combined with the master cylinder part 3.

The booster part 2 has well-known constructions. A brake pedal 6 is connected to an input rod 5 of the booster part 2 through a push rod 7. A pressure chamber 8 of the booster part 2 is connected to conduits 9 and 10. A first cut valve 11 is arranged in the one conduit 9, and a second cut valve 12 is arranged in the other conduit 10. The cut valves 11 and 12 are mechanically actuated in accordance with the movement of the input rod 5. They take selectively two positions. Normally, the one cut valve 11 takes the one position for free communication, and the other cut valve 12 takes the one position for interruption. When the brake pedal 6 is trodden to operate the input rod 5, the one cut valve 11 is changed over to the other position for interruption and the other cut valve 12 is changed over to the other position for free communication. A hydraulic accumulator 13 is connected to the second cut valve 12. Although not shown, a flexible film member is extended in a casing of the hydraulic accumulator 13, so that two chambers are formed in the casing. A pressure gas is supplied into the one of the two chambers. The accumulating pressure of the fluid accumulated in the other (accumulating chamber) of the two chambers is determined by the pressure of the pressure gas in the other of the two chambers.

A pressure-detecting switch 14 is connected to the accumulating chamber of the hydraulic accumulator 13. When the accumulating pressure in the accumulating chamber becomes lower than a predetermined value, the detecting switch 14 is changed over into the OFF state. The OFF signal of the pressure-detecting switch 14 is supplied to an ABS/ASR control unit 16 through an electric wire 15. "ABS" means "Anti-skid Brake System", and "ASR" means "Antriebs-Steuer Regelung" (German). The drive slip control or ASR control of the control unit 16 becomes inoperative with the OFF signal of the pressure-detecting switch 14.

Although not shown, wheel speed sensors are associated with the vehicle wheels, and output terminals of the wheel speed sensors are connected to the control unit 16. Skid conditions of the wheels are measured or calculated in the control unit 16 on the basis of the outputs of the wheel speed sensors.

The hydraulic reservoir 4 of the master cylinder with booster 1 is connected through a conduit 18 to a relief valve 19 which is connected through a conduit 21 to the hydraulic accumulator 13.

The conduit 9 is connected to a suction side of a fluid pressure pump 22 and to the hydraulic reservoir 4. The fluid pressure pump 22 consists mainly of a pump body 24 and an electric motor 23 for driving the pump 22. The rotational motion of the electric motor 23 is converted into a linear reciprocating motion through a cam mechanism. A piston slidably fitted into a casing is moved forwards and backwards, in the pump body 24. The pressure of a pressure chamber 25 changes lower or higher in accordance with the movement of the piston.

Check valves 27 and 29 arranged in conduits 26 and 28 connected to the pressure chamber 25 are alternately opened and closed. When the pressure of the chamber 25 becomes lower, brake fluid is sucked into the chamber 25 from the hydraulic reservoir 4 through the conduits 9 and 28 and the opened check valve 29. And when the pressure of the chamber 25 becomes higher, brake fluid is pressurized and supplied into the hydraulic accumulator 13 through the conduit 26 the opened check valve 27 and conduit 21. The relative arrangements between the booster part 2 of the tandem master cylinder with booster 1 and the fluid pressure pump 22 have been above described. Next, relative arrangements between the master cylinder part 3 and wheel cylinders will be described.

Two fluid pressure generating chambers are formed in the master cylinder part 3 of the tandem master cylinder with booster 1. Conduits 31 and 32 are connected to the fluid pressure generating chambers of the master cylinder part 3, respectively. The brake conduit system of the front-rear separation type is employed for this embodiment. The one conduit 31 is connected for front wheels 38a and 38b. It is connected to a conduit 33 which diverges into conduits 34 and 35. They are connected through electro-magnetic three-position three-port change-over valves 36 and 37 to wheel cylinders of front wheels 38a and 38b.

Check valves 39 and 40 are connected in parallel with the electro-magnetic three-position three-port change-over valves 36 and 37, respectively. They permit fluid to flow only from the wheel cylinder side towards the side of the tandem master cylinder with booster 1.

The conduit 33 is further connected to the discharge side of a fluid pressure pump 41 to be hereinafter described in detail.

The other conduit 32 is connected for rear wheels 49a and 49b. It is connected through a first electromagnetic change-over valve 42A, which is a part of a valve apparatus 80 according to this invention, a conduit 43, conduits 45 and 46 and electro-magnetic three-position three-port change-over valves 47 and 48 to wheel cylinders of the rear wheels 49a and 49b.

Check valves 50 and 51 are connected in parallel with the electro-magnetic three-position three-port change-over valves 47 and 48 respectively. They permit fluid to flow only from the wheel cylinder side towards the side of the tandem master cylinder with booster 1. A conduit 44 which is a part of a main conduit, is connected to the discharging side of the fluid pressure pump 41.

A second electro-magnetic change-over valve 42B in the valve apparatus 80 is connected between the conduits 21 and 43.

The fluid pressure pump 41 consists mainly of a pump body 53 and an electric motor 52 for driving the pump body 53. The pump body 53 includes pistons fitted slidably into a pair of cylinders and a cam mechanism for driving the pistons. Two pressure chambers 54A and 54B are formed by the pistons. Check valves 55, 56 and 57, 58 are connected to the pressure chambers 54A and 54B, respectively. Higher pressure and lower pressure are alternately generated in the pressure chambers 54A and 54B. Dampers 59 and 60 are connected to the check valves 56 and 58 of the discharging side of the fluid pressure pump 41.

The dampers 59 and 60, which have well-known constructions, have fluid-storing chambers. A part of the pressurized fluid discharged from the fluid pressure pump 41 is temporarily stored in the fluid-storing chambers of the dampers 59 and 60. Thus, the pulsating pressure of the fluid pressure pump 41 is somewhat absorbed.

Hydraulic reservoirs 61 and 62 are connected to the check valves 55 and 57 of the suction side of the fluid pressure pump 41. They temporarily store fluid under lower pressure. Pistons 61a and 62a are slidably fitted into casings, and they are urged towards the reserving chamber side by relatively weak springs 61b and 62b. The reserving chambers are connected through the electro-magnetic three-position three-port change-over valve 36, 37 and 47, 48 to the wheel cylinders of the wheels 38a, 38b and 49a and 49b. The fluid discharged from the wheel cylinders is temporarily stored in the reserving chambers of the hydraulic reservoirs 61 and 62, and it is sucked by the fluid pressure pump 41. It is pressurized and supplied to the conduits 33 and 44.

The electro-magnetic three-position three-port change-over valves 36, 37, 47 and 48 have the same constructions. Accordingly, only the valve 36 will be representatively described hereinafter. Although schematically shown, the electro-magnetic three-position three-port change-over valve 36 has well-known constructions. It takes anyone of three positions A, B and C in accordance with the current intensities of the control signal from the control unit 16.

When the control signal is "0" in current level, the electro-magnetic three-position three-port change-over valve 36 takes a first position A for increasing the brake pressure to the brake for the wheel. In the first position A, the master cylinder side and the wheel cylinder side are made to communicate with each other. When the control signal is "½" in current level, the electro-magnetic three-position three-port change-over valve 36 takes a second position B for maintaining the brake pressure to the brake at constant. In the second position B, the communications between the master cylinder side and the wheel cylinder side, and between the wheel cylinder side and the reservoir side are interrupted. When the control signal is "1" in current level, the electro-magnetic three-position three-port change-over valve 36 takes a third position C for decreasing the brake pressure to the brake. In the third position C, the communication between the master cylinder side and the wheel cylinder side is interrupted, while the communication between the wheel cylinder side and the reservoir side is made. The brake fluid is discharged through the conduit 63 into the reservoir 61 from the wheel cylinder. The other electro-magnetic three-position three-port change-over valves 37, 47 and 48 are constructed in the same manner. Other output terminals, although not shown, from the control unit 16 are connected to solenoid portions 37a, 47a and 48a of the electro-magnetic three-position three-port change-over valves 37, 47 and 48. When they are changed over to the positions C, the hydraulic reservoirs 61 and 62 are connected through conduits 64, 65, 66, 67 and 68 to the wheel cylinders of the wheels 38b, 49a and 49b, respectively.

A solenoid portion Sa of the first change-over valve 42A is connected to one output terminal (not shown) of the control unit 16. The first change-over valve 42A takes normally a D-position as shown in FIG. 1, in which the side of the conduit 32 and the side of the conduit 43 are made to communicate with each other. When an ASR signal for drive slip control is supplied to the solenoid portion Sa from the not-shown output terminal of the control unit 16, the first change-over valve 42A is changed over to another E-position to interrupt the side of the conduit 32 from the side of the conduit 43.

According to this embodiment, the rear wheels 49a and 49b are driven-wheels.

In the ASR control operation, when the ASR signal has disappeared, the change-over valves 42A and 42B are not concurrently changed over to the positions D and F. The first change-over valve 42A is changed over to the other position D from the one position E in a predetermined time directly after the second change-over valve 42B has been changed over to the other position F from the one position G.

Figure 2:
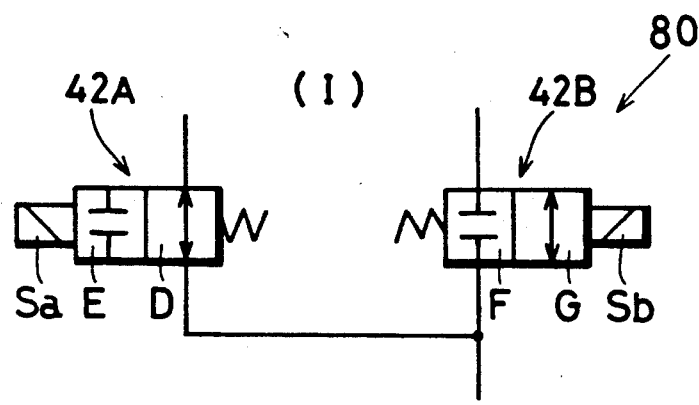
FIGS. 2I, 2II, and 2III are is partial conduit circuit diagrams of FIG. 1, for explaining operations of an important part of FIG. 1.
Figure 2:
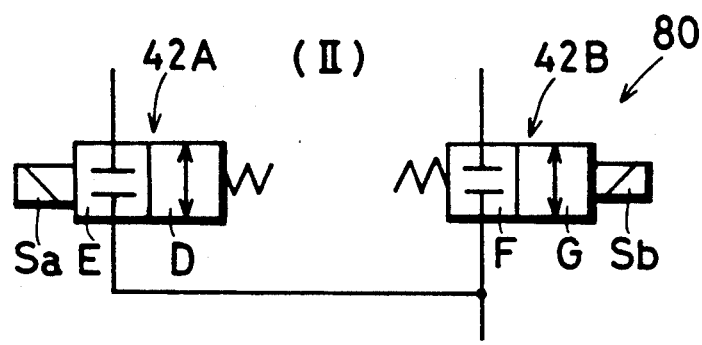
Figure 2:
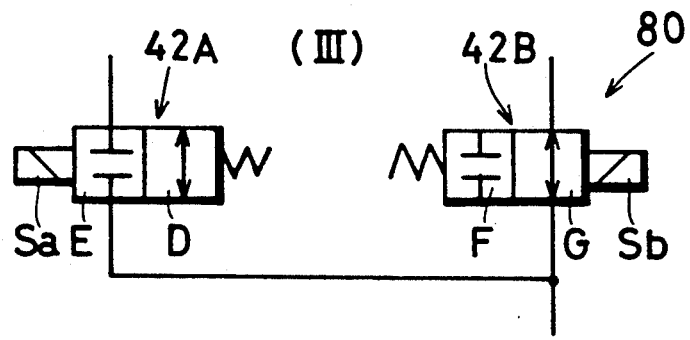

The drive method of the first and second change-over valves 42A and 42B will be described in more detail with reference to FIG. 2.

On the start of the ASR control operation, the state I of the valve apparatus 80 is changed over through the state II thereof into the state III thereof. And on the end of the ASR control operation, the state III of the valve apparatus 80 is changed over through the state II thereof into the state I thereof. The duration time of the state II in the change-over from the state I into the state III and the duration time thereof in the change-over from the state III into the state I do not always need to be equal to each other.

Next, there will be described operation of the above described fluid pressure brake control apparatus for the vehicle.

First, the usual brake operation will be described.

With the depression of the brake pedal 6, the push rod 7 is moved forwards to drive the input rod 5 of the booster part 2. Fluid pressures are generated in the master cylinder part 3.

The electric motor 23 for driving the fluid pressure pump 22 is driven with the turn-on of the engine switch. Brake fluid is sucked from the reservoir 4 of the master cylinder part 3 by the fluid pressure pump 22 and it is pressurized and supplied into the accumulator 13 thereby.

The first cut valve 11 and the second cut valve 12 are changed over from the shown positions into the cut-off state and the free communicating state, respectively, with the depression of the brake pedal 6. Accordingly, the pressurized brake fluid is supplied from the hydraulic accumulator 13 into the pressure chamber 8 of the booster part 2. The latter effects the well-known boosting operation. Thus, the driver is assisted with the treading of the brake pedal 6.

The fluid pressure generated in the one fluid pressure generating chamber of the master cylinder part 3 is transmitted through the conduit 32, the valve apparatus 80 and the electro-magnetic three-position three-port change-over valves 47 and 48 into the wheel cylinders of the rear wheels 49a and 49b. Since neither drive-slip control nor anti-skid control is yet effected, the change-over valves 42A and 42B take the normal positions D and F, respectively. The electro-magnetic three-position three-port change-over valves 47 and 48 take the positions A.

The fluid pressure generated in the other fluid pressure generating chamber of the master cylinder part 3 is transmitted through the conduit 31 and the electro-magnetic three-position three-port change-over valve 36 and 37 into the wheel cylinders of the front wheels 38a and 38b. Since neither drive-slip control nor anti-skid control is yet effected, the electro-magnetic three-position three-port change-overs valve 36 and 37 take the positions A.

Thus, the pressurized brake fluid is supplied into the wheel cylinders of the wheels 49a, 49b, 38a and 38b, and the wheels 49a, 49b, 38a and 38b are braked.

When the control unit 16 judges that the brake fluid pressure should be decreased, the electro-magnetic three-position three-port change-over valves 36, 37, 47 and 48 are changed over to the positions C, and the fluid pressure pump 41 starts to be driven. For facilitating the description, it is assumed that the brake pressures to all of the wheels 38a, 38b, 49a and 49b should be decreased at the same time.

Thus, the braking slip control starts. The discharging fluid of the fluid pressure pump 41 is supplied to the conduits 33 and 44, and therefore to the master cylinder part 3.

When the control unit 16 judges that the braking force should be reapplied, the electro-magnetic three-position three-port change-over valve 36, 37, 47 and 48 are changed over to the position A. The pressurized fluid is supplied to the wheel cylinders from the fluid pressure pump 41 and from the master cylinder part 3.

When the control unit 16 judges that the brake fluid pressure should be maintained at constant, the electro-magnetic three-position three-port change-over valve 36, 37, 47 and 48 are changed over to the position B.

The braking slip (anti-skid) control operation are effected in the above-described manner.

Next, there will be described the drive slip control operation.

The clutch is changed over and the acceleration pedal is trodden to start the vehicle. The torque of the engine rises and thus the vehicle starts to run. However, if the torque of the engine overcomes the frictional force between the wheel and the road surface, there occurs slip phenomenon, and the rotational speed of the wheel becomes higher than the vehicle speed. If the vehicle runs under such a condition, the steering performance becomes unstable. Accordingly, the drive slip is controlled with the control unit 16 in this embodiment.

When the drive slip of the driven wheel 49a or 49b is judged to be larger than a predetermined value, by the control unit 16, the latter generates the ASR signal and supply it to the solenoid portion Sa of the first change-over valve 42A in the valve apparatus 80. Thus, it is changed over from the shown position D into the cut-off position E. However, the solenoid portion Sb of the second change-over valve 42B is not yet energized, and it remains at the shown position F. Thus, the valve apparatus 80 takes the state II as shown in FIG. 2, for a predetermined time directly after the first change-over valve 42A has been changed over. Then, the solenoid portion Sb of the second change-over valve 42B is energized by the ARS signal, and it is changed over from the shown position F into the communicating state G. Thus, the valve apparatus 80 takes the state III as shown in FIG. 2.

In the state III of the valve apparatus 80, the conduit 21 is made to communicate with the conduit 43 and the side of the tandem master cylinder with booster 1 is cut off from the side of the electro-magnetic three-position three-port change-over valves 47 and 48. In the intermediate state II of the valve apparatus 80, the accumulating pressure of the hydraulic accumulator 13 and the discharging pressure of the fluid pressure pump 22 are not transmitted to the master cylinder part 3. Accordingly, when the valve apparatus 80 is changed over from the state I into the state III, the fluid pressure is not prevented from being transmitted to the master cylinder part 3. The brake fluid accumulated in the hydraulic accumulator 13 is supplied through the conduit 21, the second change-over valve 42B, the conduit 43 and the electro-magnetic three-position three-port change-over valves 47 and 48 to the wheel cylinders of the rear wheels 49a and 49b as the driven wheels.

Thus, the drive-slip control is effected. The drive slip of the rear wheels 49a and 49b is decreased with the braking force. According to this embodiment, the braking force is stepwisely increased. The electro-magnetic three-position three-port change-over valves 47 and 48 are alternately and periodically changed over between the position A and the position B. Thus, the fluid pressure of the wheel cylinders of the rear wheels 49a and 49b are stepwisely increased.

For facilitating the description, it is assumed that the drive slips of the rear wheels 49a and 49b change in the same manner.

When the control unit 16 judges that the braking force to the driven wheels should be now decreased, the electro-magnetic three-position three-port change-over valves 47 and 48 are alternately and periodically changed over between the position B and the position C. Thus, the braking force is stepwisely decreased. Then, the fluid pressure pump 41 starts to be driven. The pressurized brake fluid is discharged through the discharging ports of the electro-magnetic three-position three-port change-over valves 47 and 48 and the discharge conduits 66 and 67 into the hydraulic reservoir 62 from the wheel cylinders of the rear wheels 49a and 49b.

The brake fluid is sucked by the fluid pressure pump 41 from the hydraulic reservoir 62 and pressurized and supplied through the conduit 44 and the second change-over valve 42B into the hydraulic accumulator 13. The braking forces to the rear wheels 49a and 49b are decreased. The brake fluid pressure is maintained at constant in the positions B of the electro-magnetic three-position three-port change-over valves 47 and 48. Accordingly, the fluid pressures of the wheel cylinders of the rear wheels 49a and 49b are decreased in the stepwise manner.

The above stepwise increase and decrease of the braking force are repeated in some cycles, and so the drive slip is controlled to the optimum.

The operations of this embodiment have been described above. Next, effects or advantages of this embodiment will be described.

In this embodiment, the two cut-off valves are arranged as the change-over valves 42A and 42B. The one cut-off valve 42A is connected through the conduit 32 to the tandem master cylinder with booster 1, and it takes normally the position D for communication. Thus, it makes the tandem master cylinder with booster 1 communicate with the electro-magnetic three-position three-port change-over valves 47 and 48. On the other hand, the change-over valve 42B takes normally the position F for interruption. The input port thereof is connected to the hydraulic accumulator 13 through the conduit 21. The output port thereof is connected to the electro-magnetic three-position three-port change-over valves 47 and 48 through the conduit 43.

The cut-off valves 42A and 42B take normally the shown positions. On the start of the drive slip control, the solenoid portion Sa is first energized to change over the cut-off valve 42A into the cut-off state, and after the predetermined time, the solenoid portion Sb is energized to change over the cut-off valve 42B into the communicating state.

When the energized cut-off valves 42A and 42B are changed over into the normal state, the cut-off valve 42B is first changed over to the shown position, and after the predetermined time, the cut-off valve 42A is changed over into the shown position.

When the prior valve apparatus is changed over from the first position into the second position, or from the second position into the first position, there is the fear that the master cylinder communicates instantaneously with the pressure source. Thus, there is the fear that the high pressure fluid is transmitted to the master cylinder from the hydraulic accumulator as the pressure source and so the piston seal or the like in the master cylinder is damaged. However, such a fear can be avoided according to the embodiment of this invention.

Since the change-over times of the cut-off valves 42A and 42B are shifted from each other, it can be securely avoided that the cut-off valves 42A and 42B take concurrently the communicating state. Thus, the seal portion or the like is prevented from being damaged.

Further, in the embodiment of this invention, the discharging fluid of the fluid pressure pump 41 or the discharging fluid from the wheel cylinders is not returned into the open hydraulic reservoir, but into the main brake conduit. Accordingly, the closed loop is formed for the brake fluid, so that it can be securely avoided that the stroke or forward movement of the piston is increased to the full length in the master cylinder part 3.

When the brake is relieved in the drive slip control operation, it is considered that the brake fluid from the hydraulic reservoir 62 is returned into the reservoir 4 of the master cylinder part 3 through a valve apparatus which takes a cut-off state during the anti-skid control operation. However, such a valve apparatus is not required in the embodiment of this invention. The fluid pressure pump for anti-skid control is used also during the drive slip control. The brake fluid is supplied into the hydraulic accumulator 13 through the change-over valve 42B from the hydraulic reservoir 62 by the fluid pressure pump 41. When the pressure of the hydraulic accumulator 13 becomes excessively high, the brake fluid is relieved through the relief valve 19 into the reservoir 4. Since the above-described special valve apparatus is not required, the cost of the apparatus is lower. Parts of high performance are not required.

The reliability of the apparatus can be raised.

While the preferred embodiment has been described, variations thereto will occur to those skilled in the art within the scope of the present inventive concepts which are delineated by the following claims.

For example, although the master cylinder with booster has been described in the above embodiment, this invention can be, of course, applied to a master cylinder without booster, or a usual master cylinder. The tandem master cylinder with booster 1 in the above embodiment is schematically shown. However, all of well-known booster can be applied to this invention.

In the above embodiment, the one three-port three-position valve is provided for the one wheel brake apparatus. Alternatively, two two-port two-position valves or an inlet valve and an outlet valve may be used for the one wheel brake.

Further, in the above embodiment, the second fluid pressure pump as the hydraulic pressure source is used also for the booster. However, a separate fluid pressure pump may be provided exclusively for the booster. That holds true of the hydraulic accumulator.

Further, the rear wheels are driven-wheels in the above embodiment. This invention can be applied to vehicles in which front wheels are driven-wheels or vehicle of four-wheel drive type (4WD type). Further, it can be applied to a motor-cycle.

In the above embodiment, the reservoir combined with the master cylinder part is used as the second hydraulic reservoir. Alternatively, a separate hydraulic reservoir in which always reserves brake fluid more than a predetermined amount, may be provided.

Further, in the above embodiment, the dampers 59 and 60 are arranged for attenuating the pulsating pressure of the fluid pressure pump 41. A check valve, which permits fluid to flow from the tandem master cylinder with booster 1 to the valve apparatus 80, may be arranged between the first change over valve 42A of the valve apparatus 80 and the tandem master cylinder with booster 1 in order to improve further the pedal feeling of the driver. In that case, another check valve for return the brake fluid is connected between the wheel cylinders and the master cylinder part 3.

Further, a damping apparatus which consists of a check valve, which permits fluid to flow from the master cylinder side towards the side of the change-over valve 42A, and a throttle connected in parallel with the check valve, may be arranged between the master cylinder part 3 and the first change-over valve 42A, in order to attenuate the pulsating pressure of the fluid pressure pump 41.

Further, the fluid pressure control valves (the electro-magnetic three-position three-port change-over valves 36, 37 and 47, 48) are provided for the four wheels, respectively. Thus, the so-called four-channel control method is employed for the above embodiment. Alternatively, the so-called two-channel control method or three-channel control method may be used for the vehicle of the front-rear separation braking conduit system as above described or for a vehicle of the X-conduit braking conduit system in which the front wheels and rear wheels are diagonally connected to each other.

Instead of the first change-over valve 42A, such a change-over valve may be used that takes normally one position for free communication and the other position, when energized, for functioning as a relief valve which relieve the high pressure fluid toward the master cylinder side from the side of the fluid pressure pump 41. Alternatively, a by-pass conduit, in which a relief valve is arranged, may be connected in parallel with the change-over valve 42A. The high pressure fluid is relieved from the side of the fluid pressure pump 41 toward the master cylinder side. That holds true of the second change-over valve 42B. By such arrangement, it can be avoided that the pressure of the side of the fluid pressure pump 41 becomes extremely high, when the change-over valves 42A and 42B have the trouble to remain locked at the cut-off positions.

Further, instead of the two-port two-position change-over valves 42A and 42B, one electro-magnetic three-port three-position change-over valve as the electro-magnetic three-position three-port change-over valve 36, 37 and 47, 48, may be used in the above embodiment. In that case, the position A is changed over to the position C through the position B, and the position C is changed over to the position A through the position B.

The valve then takes the position B for a predetermined time. However, when the change-over valve is changed from the position A or C into the position B, there is the possibility that the pressure source is made instantaneously to communicate with the master cylinder, and the high pressure fluid from the pressure source is applied to the seal portion of the piston in the master cylinder, to damage the seal portion. Accordingly, it is preferable to use the two two-port two-position change-over valves 42A and 42B as in the above embodiment.

What is claimed is:

1. A fluid pressure brake control apparatus for a vehicle for controlling braking-slip and driving-slip of wheels, comprising:
   (A) fluid pressure control valve means arranged between a fluid pressure source for driving-slip control and a master cylinder, and wheel brake apparatus, for controlling brake fluid pressure of said wheel brake apparatus;
   (B) a valve apparatus arranged between said fluid pressure control valve means and said master cylinder, and between said fluid pressure control valve means and said fluid pressure source, said valve apparatus taking a first condition in which the side of said fluid pressure control valve means is connected with the side of said master cylinder, while the side of said fluid pressure control valve means is disconnected from the side of said fluid pressure source, a second condition in which the side of said fluid pressure control valve means is connected with the side of said fluid pressure source, while the side of said fluid pressure control valve means is disconnected from the side of said master cylinder and a third condition in which the side of said fluid pressure control valve means is disconnected from the side of said master cylinder, and the side of said fluid pressure control valve means is disconnected from the side of said fluid pressure source;
   (C) fluid pressure pump means which pressurizes brake fluid discharged through said fluid pressure control valve means from said wheel brake apparatus, when the brake pressure is lowered with control of said fluid pressure control valve means and is able to supply the pressurized brake fluid into a conduit connecting said valve apparatus with said fluid pressure control valve means; and
   (D) said valve apparatus taking said second condition during the driving-slip control for supplying to said fluid pressure source the pressurized brake fluid discharged from said fluid pressure pump means.

2. A fluid pressure brake control apparatus for a vehicle, according to claim 1, in which said valve apparatus is changed over through said third condition from said first condition into said second condition on the start of the drive-slip control, and it is changed over through said third condition from said second condition into said first condition on the end of the drive-slip control.

3. The fluid pressure brake control apparatus for a vehicle according to claim 1 in which said valve apparatus continues to take third condition for a predetermined time in the change-over from said first condition into said second condition and in the change-over from said second condition into said first condition .

4. A fluid pressure brake control apparatus for a vehicle according to claim 1 in which said valve apparatus consists of a first cut-off valve and a second cut-off valve, said first cut-off valve being arranged between said fluid pressure control valve means and said master cylinder, taking one position for free communication in said first condition and the other position for cut-off in said second condition, and second cut-off valve being arranged between said fluid pressure control valve means and said fluid pressure source, taking one position for cut-off in said first condition and the other position for free communication in said second condition, and each of said first and second cut-off valves take said position for cut-off in said third condition.

5. A fluid pressure brake control apparatus for a vehicle according to claim 4 in which said first and second cut-off valves continue to take said position for cut-off in said third condition for a predetermined time in the change-over from said first condition into said second condition and in the change-over from said second condition into said first condition 6. A fluid pressure brake control apparatus for a vehicle, according to claim 1, in which said master cylinder is combined with a booster and said fluid pressure source is used also for said booster.

7. A fluid pressure brake control apparatus for a vehicle, according to claim 1, in which said fluid pressure source is connected through a relief valve to a hydraulic reservoir combined with said master cylinder.

8. A fluid pressure brake control apparatus for a vehicle, according to claim 7, in which said fluid pressure source includes a hydraulic accumulator and second fluid pressure pump means and fluid is sucked from said hydraulic reservoir, pressurized and supplied to said hydraulic accumulator by said second fluid pressure pump means.

9. A fluid pressure brake control apparatus for a vehicle for controlling braking-slip and driving-slip of the vehicle wheels, comprising:
   (A) fluid pressure control valve means arranged between a fluid pressure source for driving-slip control and a master cylinder, and wheel brake apparatus, for controlling brake fluid pressure of said wheel brake apparatus;
   (B) a valve apparatus arranged between said fluid pressure control valve means and said master cylinder, and between said fluid pressure control valve means and said fluid pressure source, said valve apparatus being operable via conduit means to assume first, second and third conditions wherein, in said first condition said fluid pressure control valve means communicates in fluid communication with said master cylinder and is cut-off from fluid communication with said fluid pressure source, in said second condition said fluid pressure control valve means communicated in fluid communication with said fluid pressure source and is cut off from fluid communication with said master cylinder, and is said third condition said fluid pressure control valve means is cut off from fluid communication with said master cylinder and with said fluid pressure source;
   (C) fluid pressure pump means which is operable to pressurize brake fluid discharged through said fluid pressure control valve means from said wheel brake apparatus when the brake fluid pressure is lowered with control of said fluid pressure control valve means and is further operable to supply such pressurized brake fluid into the said conduit means connecting said valve apparatus with said fluid pressure control valve means; and
   (D) said valve apparatus being operable to take said second condition during operation of such driving-slip control and being further operable to supply to said fluid pressure source pressurized brake fluid discharged from said fluid pressure pump means.

10. A fluid pressure brake control apparatus for a vehicle according to claim 9 in which said valve apparatus is changed over through said third condition form said first condition into said second condition on the start of such drive-slip control operation, and is changed over through said third condition from said second condition into said first condition on the end of such drive-slip control operation.

11. A fluid pressure brake control apparatus for a vehicle according to claim 9 in which said valve apparatus continues in said third condition for predetermined time in the change-over from said first condition into said second condition and in the change over from said second condition into said first condition.

12. A fluid pressure brake control apparatus for a vehicle according to claim 9 in which said valve apparatus consists of a first cut-off valve and a second cut-off valve, said first cut-off valve being arranged between said fluid pressure control valve means and said master cylinder and being operable to take one position for free communication in said first condition and another position for cut-off in said second condition, and said second cut-off valve being arranged between said fluid pressure control valve means and said fluid pressure source and being operable to take one position for cut-off in said first condition and another position for free communication in said second condition, and said first and second cut-off valves both take said position to cut-off in said third condition.

13. A fluid pressure brake control apparatus for a vehicle according to claim 12 in which said first and second cut-off valves continue in said position for cut-off in said third condition for a predetermined time in the change-over from said first condition into said second condition and in the change-over from said second condition into said first condition.

14. A fluid pressure brake control apparatus for a vehicle according to claim 9 in which said master cylinder includes a pressure booster and said fluid pressure source includes said booster.

15. A fluid pressure brake control apparatus for a vehicle according to claim 9 in which said master cylinder includes a hydraulic reservoir portion and said fluid pressure source is connected through a relief valve to said hydraulic reservoir portion.

16. A fluid pressure brake control apparatus for a vehicle according to claim 15 in which said fluid pressure source includes hydraulic accumulator means and second fluid pressure pump means which is operable to draw fluid from said hydraulic reservoir portion and to pressurize such fluid by supplying thereof to said hydraulic accumulator means.

* * * * *